US007435953B2

(12) United States Patent
Freeouf

(10) Patent No.: US 7,435,953 B2
(45) Date of Patent: Oct. 14, 2008

(54) QUADRUPOLE MASS FILTER LENGTH SELECTION

(75) Inventor: John Lawrence Freeouf, Portland, OR (US)

(73) Assignee: Interface Studies Inc., Portland, OR (US)

( * ) Notice: Subject to any disclaimer, the term of this patent is extended or adjusted under 35 U.S.C. 154(b) by 409 days.

(21) Appl. No.: 11/364,105

(22) Filed: Feb. 28, 2006

(65) Prior Publication Data

US 2007/0200061 A1 Aug. 30, 2007

(51) Int. Cl.
*H01J 49/42* (2006.01)
*H01J 49/00* (2006.01)
*B01D 59/44* (2006.01)

(52) U.S. Cl. ....................... 250/292; 250/290; 250/281; 250/282; 250/288

(58) Field of Classification Search ................. 250/292, 250/290, 281, 282, 288
See application file for complete search history.

(56) References Cited

U.S. PATENT DOCUMENTS 6,239,429 B1 * 5/2001 Blessing et al. ............. 250/292
7,208,729 B2 * 4/2007 Syms ......................... 250/288

OTHER PUBLICATIONS

Syms et al, "Design of a Microengineered Electrostatic Quadropole Lens" IEEE Transactions on Electron Devices, vol. 45, No. 11, Nov. 1998, p. 2304-2311.

Peter Dawson Editor, "Quadrupole Mass Spectrometry and Its Applications" American Institute of Physics, 1995 Elsevier Scientific Puf. Co. p. 19-L52.

Ferran et al, "High Pressure Effects In Miniature Arrays of Quadrupole Analyzers for Residual Gas Analysis From Oct. 9 to Oct. 2 for Tore", J. Vac. Sci, Tech. vol. A 14(3) May/Jun 1996 p. 1258-1265.

Boomsellek et al, "Tradeoffs In Miniature Quadrupole Designs", J. Am. Soc. Mass Spectrom, 2001, 12, p. 633-640.

Peterman et al, "Building Thick Photoresist Structure From The Bottom up" J. Micromechanics and Microengineering, 13, 2003 pp. 380-382.

Technical Data Brochure, Micro Chem Corp. "NANO™ SU-82000", Negative Tone Photresist Formulations 2035-2100, 4 Pages.

Technical Data Brochure, Micro Chem Corp, "NANO™ PMMA and Co Polymer", 7 Pages.

Technical Data Brochure, Rohm & Haas Corp, Electronic Materials, "BPR100™ Photoresist", 4 Pages.

Brubaker et al, "Theoretical and Experimental Comparisons of Quadrupole Mass Analysers with Round and Hyperbolic Figure Forming Surfaces", NASA Center For Aerospace Information, Proceedings of Int'l Conf. on Mass Spectrosiopy, Sep. 1969, pp. 98-103.

* cited by examiner

*Primary Examiner*—Nikita Wells

(57) ABSTRACT

In this invention the technology is provided for rod shaped conductor member fabrication in situ, in position, in the mass filter spatial configuration by growth through vertically repeated conduit mold formations, filling the conduit increments with to be rod material, and coalescing the growth increments as the rod length is achieved.

8 Claims, 5 Drawing Sheets

Chart of Main Process Steps

| | |
|---|---|
| | Step1 Oxidize 150 µm thick Si wafer |
| Mask1 | Step2 Define posts and access holes in oxide |
| DF** | (put 2.5 mm x 2.5 mm alignment marks) |
| | Step3 Etch openings through Si |
| | Step4 Thermal oxide 1 µm thick for major isolation |
| Mask2 | Step5 Prepare seperate wafer with patterned strike layer |
| | for electroplating |
| | Mount etched Si wafer to wafer with strike layer, |
| | aligning to pattern |
| | Step6 Electroplate posts in the large holes in 150 µm |
| | thick Si wafer–don't overplate |
| | Step7 Deposit low temperature oxide<650° C |
| Mask3 | Step8 Pattern oxide with Metal 1 pattern |
| DF | Step9 Etch oxide |
| | Step10 Deposit Metal 1 Cr/Au(50/200 µm ) |
| Mask4 | Step11 Pattern Metal1 |
| LF | Step12 Etch Metal1 |
| | Step13 Deposit low temperature oxide<650° C |
| Mask5 | Step14 Pattern oxide with Metal2 layout |
| DF | Step15 Etch oxide |
| | Step16 Deposit Metal2 |
| Mask6 | Step17 Pattern Metal2 |
| LF | Step18 Lift–off Metal2 |
| | Step19 Release strike layer wafer |
| Mask2 | Step20 Prepare new carrier wafer deposit e–plate block |
| LF | for 20 µm access opening |
| | Step21 Machine to make cavities 2.5 mm sqare areas |
| Mask7 | Step22 Pattern oxide and open holes |
| LF | |

FIG.4A

| | |
|---|---|
| Mask8 LF | Step23a Go to wafer at step19.Spin on 100 μm thick BRP100 negative resist(aqueous),pattern holes for posts |
| | Step23b Electroplate 100 μm deep holes |
| | Step23c Repeat Step23a |
| | Step23d Repeat Step24b |
| | Step23e Repeat Step23a |
| | Step23f Repeat Step24b |
| | Step23g Repeat Step23a |
| | Step23h Repeat Step24b |
| | Step23i Repeat Step23a |
| | Step23j Repeat Step24b |
| | Step24 Strip BPR100 resist |
| | Step25 Spin on 20 μm thick SU8 as bonding layer on the cavity wafer |
| | Step26 Attach wafer with e-plated rods to laser cut wafer |
| | Step27 Fill cavity with PMMA and planarize |
| | Step28 Spin-on 20 μm thick SU8 as capping layer |
| Mask9 LF | Step29 Pattern su8 with access holes |
| | Step30 Dissolve PMMA out of cavity |
| | Step31Deposit metal layer over SU8 cap |
| | Step32 Release carrier wafer |

**Note;DF-Dark field mask,LF-Light field mask

FIG.4B

QUADRUPOLE MASS FILTER LENGTH SELECTION

This invention was made with government support under contract #W31P4Q-04-C-R311 awarded by the U.S. Army. The government has certain rights in the invention.

FIELD OF THE INVENTION

The invention is in the field of sensing the presence and quantity of chemicals in an ambient using a solid state quadrupole mass spectrometer device; and in particular to the fabrication of the high aspect ratio rod configuration assemblies that are a building block in the fabrication of the solid state quadrupole mass spectrometer device.

BACKGROUND AND RELATION TO THE PRIOR ART

Quadrupole mass spectrometer apparatus, for use in the sensing of the presence and quantity of chemicals in a gaseous ambient, would include as a main element, a quadrupole mass filter structural assembly capable of atomic selection based on atomic particle mass, together with means for introducing ionized ambient gas into the quadrupole mass filter, means for detecting specific ions in the ionized gas and means for detecting quantity and quality attributes of those selected ions.

In operation; to the quadrupole mass spectrometer device, there is supplied to individual diagonally positioned pairs of rod shaped conductor members, combined, direct current (DC) levels and phased radio frequency (RF) signals; such that, for a fixed value of RF and DC voltages, input ion energy, conductor dimensions and frequency: there is produced a hyperbolic field. The hyperbolic field affects the ability of certain ions, having a specific ratio of charge to mass, that in turn is identifiable with certain chemicals, to be diverted for processing in a detection capability.

The technology of quadrupole mass spectrometry is being extensively studied in the art. Examples of publications are Peter H. Dawson, *Quadruple Mass Spectroscopy and its Applications*, (Elsevier, N.Y. (1976), pp 9-11), and R. A. Syms et al, in IEEE Transactions on Electron Devices 45, 2304(1998).

In the translation of the quadrupole mass spectrometry technology into useful devices and apparatus there will be encountered interrelated dimensions within an operating background pressure that in turn is in an assembly of rod shaped members in a spatial volume wherein fields can provide conditions for chemical separation. To the quadrupole mass spectrometer device, there is supplied to individual diagonally positioned pairs of the rod members, combined, direct current (DC) levels and phased radiofrequency (RF) signals; such that, for a fixed value of RF and DC voltages, input ion energy, conductor dimensions and frequency: there is produced a hyperbolic field in the spatial volume. The hyperbolic field affects the ability of certain ions, arriving through the ion path opening, that have a specific ratio of charge to mass, that in turn is identifiable with certain chemicals, to traverse the spatial volume and be processed in a detection capability beyond the ion path exit.

The quadrupole mass spectrometer device is sensitive to dimensions and operating pressure. The work of Boomselleck and Ferran, reported in Am. Soc. For Mass. Spec. 12,633 (2001) advances highly useful factors including that maximum operating pressure is inversely proportional to the length dimension of the mass filter, and, that sensitivity is influenced by the "r" and "L" dimensions of the mass filter. The dimensions "r", "L", and "D" are labelled in FIG. 2.

As the art has developed, a promising design for the mass filter has evolved; wherein between upper and lower plane surfaces there is an enclosed spatial volume within which there is located a configuration of four parallel, equidistant as around a bolt circle, rod shaped conductor members, each of which extends between the upper and lower plane surfaces. The promising mass filter design further provides an ion path opening and exit, positioned, centered into and centered exiting from the upper and lower planes within the spatial volume containing the rod shaped conductor member configuration. The rod configuration is a building block in the fabrication of the mass filter. This building block, in turn, permits the fabrication capabilities of the semiconductor industry in producing large area arrays.

At this point in the art however there is a significant technical hurdle to be overcome because the length dimension of the mass filter will have to be very long in relation to the horizontal dimensions in other words the mass filter will have to have a large relative length to horizontal aspect ratio.

SUMMARY OF THE INVENTION

In this invention the technology is provided for rod shaped conductor member fabrication in situ, in position, in the mass filter spatial configuration by growth through vertically repeated conduit mold formations, filling the conduit increments with to be rod material, and coalescing the growth increments as the rod length is achieved.

BRIEF DESCRIPTION OF THE DRAWINGS

FIG. 4 is a flow chart of the main process steps in the incremental rod fabrication.

DESCRIPTION OF THE INVENTION

Figure 1:
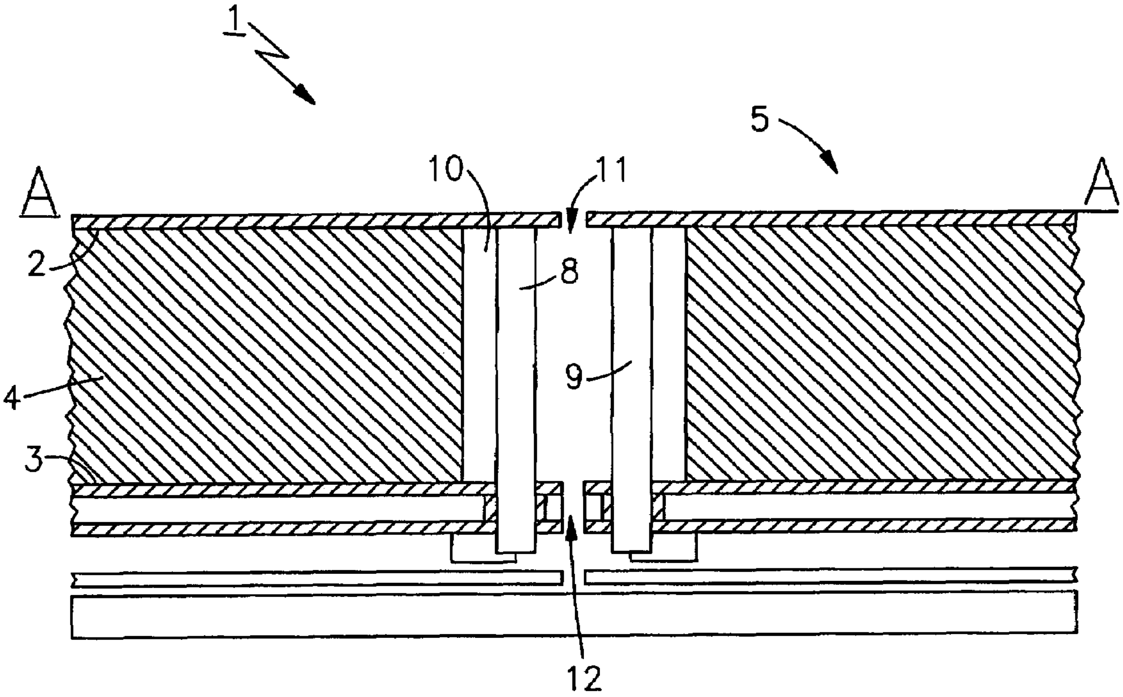
FIG. 1 is a cross sectional depiction along a line A-A, of the relative superpositioned relationship of the elements in the mass filter and their positioning in the spatial volume.

This invention is directed to the in situ fabrication of rod shaped elements that are to be an integral part of the hyperbolic field apparatus of the mass filter and which will be located within the mass filter. The mass filter and it's operation is described in connection with FIGS. 1 and 2 wherein each component has the same reference numeral.

Figure 2:
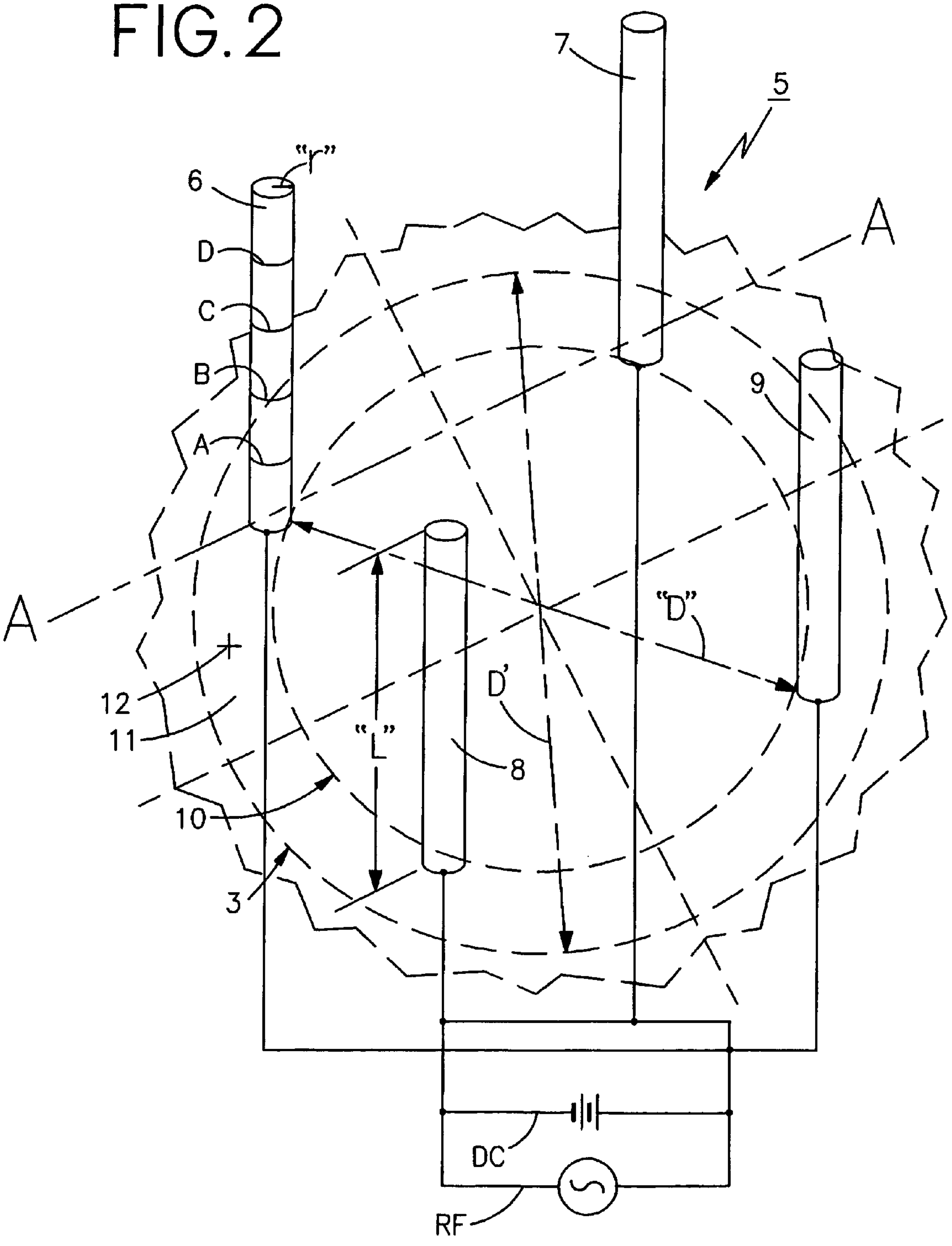
FIG. 2 is a cross sectional depiction of the mass filter building block, where a protective membrane has been removed for visibility; and wherein there is shown, positioned along a cross section line A-A, two of the four equidistant, as in a bolt circle type, rod element configuration made up of serially, incrementally fabricated in accordance with this invention, rod elements.

Referring to FIGS. 1 and 2 together, in the quadrupole mass filter 1, at site locations between the parallel surfaces 2 and 3 of a planar type member 4 such as a wafer, of a generally non conductive material of for example Silicon (si); the quadrupole mass filter device 1 is positioned, in which there is a configuration 5 of four, parallel rod shaped conductor members, (6,7,8 & 9 in FIGS. 2 and 8 & 9 in FIG. 1), positioned orthogonal with respect to the parallel surfaces 2 & 3 in FIGS. 1 and 2 and equidistantly positioned from each other as in a bolt circle. A membrane on surface 2 has been removed for better viewing in FIG. 2.

The four, rod shaped conductor members, 6,7,8 & 9, in each mass filter device, surround a spatial volume 10 in the material of the wafer. The wafer material, within what is to be the spatial volume 10 will be later removed by etching. An ion path passes through the top one of the parallel wafer surfaces 2,3, extends through the enclosed spatial volume 10 and continues out the bottom one, 3, of the parallel wafer surfaces, 2 & 3.

There is delivered to pairs of diagonally positioned individual rod members (6,9 & 7,8); with dimensional relations "r", "D" and "L" combined, direct current (DC) levels and phased radio frequency (RF) signals; whereby, a hyperbolic cylindrical field is produced in the spatial volume 10. The connections are shown in FIG. 2 where they are more visible but the actual connections are made below surface 3 in FIG. 1.

The ionized ambient gas; in which the ions are at fixed energy that must be controlled by applied potentials, is focused into the ion path at the opening 11 in the top one of the parallel wafer surfaces through the hyperbolic field in the spatial volume and out the ion path exit 12 in the bottom one of the parallel surfaces. The ions in the ionized ambient gas that have a specific ratio of charge to ion mass are selected in passing through the field in the spatial volume and exit in the ion path into the subsequent stage. The actual dimensions involved are quite small and the vertical distance between the surfaces is much greater than the horizontal distances between rods. Those dimensions in turn affect many parameters of the mass filter. Assuming, as an example, a mass filter that is built in silicon and occupies about a cubic centimeter in volume. The length of the rods 6-9 will affect the traverse rate of the ions and hence the quantity of ions that are selected in the filter. The work of Ferran and Boomselleck, titled "*Effects of quadrupole analysers for RGA*", published in JVST A—Vacuum, Surfaces, and Films, page 1258 (2001) provides a good perspective in selection. The length of the rods 6-9 labelled distance "L" in FIG. 2, would be about 500 micrometers. The radius of an individual rod, labelled dimension "r" in FIG. 2, would be about 4.56 micrometers and the diameter of a circle that tangentially touches all four of the rods 6-9 in the example configuration, labelled dimension "D" in FIG. 2 would be about 8 micrometers.

The work of Peterman et al, titled "*Building thick photoresist structures from the bottom up*" published by J. Microtech. Microeng. 13, 380(2003), demonstrates forming high aspect ratio structures from single layers and the ability to add an additional layer.

This invention provides the ability to form structures from many layers sufficient to meet the complex future dimensional requirements.

Figure 3:
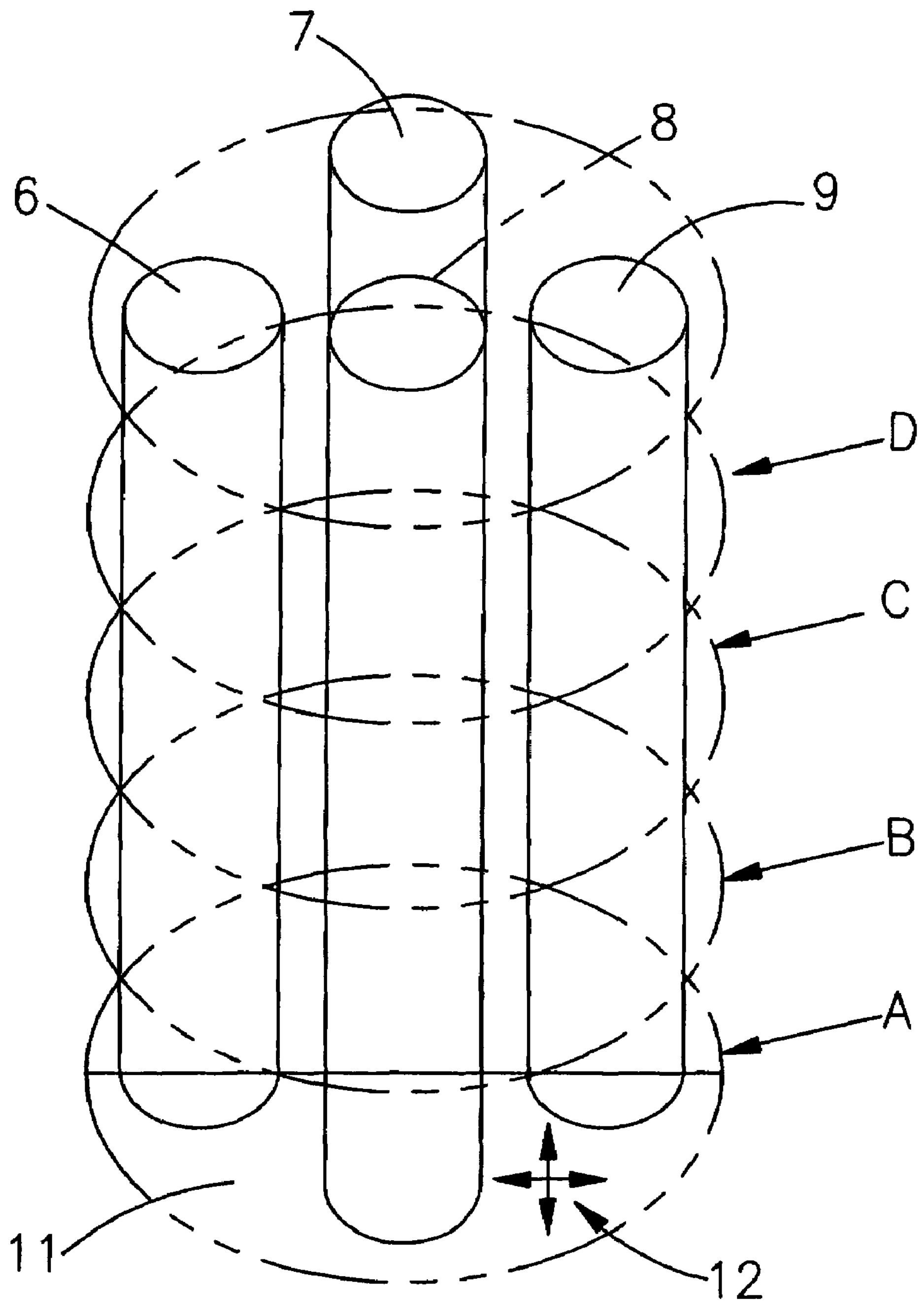
FIG. 3 is a depiction of alignment guiding as incremental fabrication proceeds.

Referring to FIG. 3 a depiction is provided of the incremental fabrication operation of the invention, in which, using reference numerals as used in FIGS. 1 and 2 on a substrate equipped with registration capability, serial depositions of which four can be accomplished and are shown, which in turn permit substantial extension in the vertical direction. In FIG. 3, the registration capability is illustrated as a guidance symbol 12 on a substrate 11 that is is positioned with reference to the plane and location on that plane of the bottom of each of the four rod members 6-9. The registration capability can provide orientation for runout as the vertical dimension gets longer and arrays extend over greater area in the horizontal direction. The guidance symbol can also be placed on subsequent layers.

There are four layers of light responsive materials labelled layers A-D. Each layer is the outermost layer for a vertical section.

FIG. 4 is a step by step flow chart of the main process steps in the incremental rod fabrication.

In connection with FIGS. 1-4 a procedure is described based on recent developments in the thick type of light responsive, commonly called photoresist, technology. The technology and the structure produced presents a number of fabrication challenges, including; the structure and the parts thereof are tall and must be parallel to one another to a high degree of precision; the opposing pairs of the rod elements must be able to sustain a high voltage difference without electrical leakage or breakdown; access and exiting for ions must be centered in the rod configuration and the configuration structure must be housed and supported.

The procedure is based on thick photoresist technology. Some examples described in the art are NANO S U 8-2000, NANO PMMA, of Micro Tm Chem Newton, Mass. and BPR 100 Photoresist. Electronic Materials, Marlborough, Mass.

A pedestal as indicated at level A of FIG. 3 is fabricated in the SU-8, rods are formed in a cavity formed from the wafer then covered top and bottom with a membrane of SU-8. The bottom of the wafer serves as a pedestal for rods and electrical contacts to opposing pairs of rods. Referring to FIG. 4 a flow chart as provided of the main process steps in the incremental rod fabrication. The process begins at Step 1 by the oxiding of the thin 150 micrometer base plate 11 substrate and using lift off to pattern the oxide using Mask 1. The mask set is shown in FIG. 4. The patterned wafer is then etched using deep reactive ion etching to produce through wafer holes in the pattern of the rod and access hole layout. The wafer is then given a high temperature thermal oxide to produce an insulating barrier. In FIG. 4, Step 5*a* carrier wafer is prepared with the pattern, Mask 2, for electroplating the rods but not the access holes. The through etched wafer is aligned and attached to the patterned carrier wafer and the through holes in the wafer filled with Au metal. In Step 7 the electroplating carrier wafer is removed and a low temperature oxide is deposited over the entire structure. The oxide is then patterened in Step 8 with mask 3 to produce openings for making electrical connections for oneset of rods. Metal 1(Cr/Au) is deposited and patterened with Mask 4 by lift off to produce the connecting lines for the first set of rods. Another low temperature oxide, Step 13, is deposited over the entire structure again to provide electrical isolation between the two sets of connection lines. This oxide is patterned with Mask 5 and openings etched. Metal layer 2(Cr/Au) is deposited and patterned with mask 6 and liftoff, Step 18. Other metals may be used for metals 1 & 2. Prepare a new carrier wafer using Mask 2, Step 20, for electroplating the rods, electrical contact is made the metal interconnect lines just completed. The wafer must be flipped over to mate to the carrier wafer. The oxide on the new top side must now be patterned with Mask 8 and etched (Step 22) to open up the holes for electroplating the rods.

The cavity wafer that encloses the quadrupole devices is prepared, (Step 21) The cavity openings are laser machined through the 500 micrometer thick wafer. The cavity openings become accessible at Mask 7. Spin coat the wafer with 100 micrometer thick layer of BPR resist (Step 23*a*) using Mask 8 to pattern the openings for electroplating the rods. (Step 23*b*), electroplate the next 100 micrometer length of rod through the thickness of the resist. Repeat Steps 23*a* and 23*b* four more times to produce the 500 micrometer tall rods (Steps 23*c* through 23*j*). Dissolve the BPR resist. Spin a 20 micrometer thick layer of SU-8 on the laser machined cavity wafer (Step 24) and attach to the wafer with the electroplated rods. The cavity is then filled with PMMA and planarized in (Step 25). A thick layer of SU-8 is spun onto the planarized surface and patterned with (Mask 9) to produce the access holes. Finally a metal film is deposited over the SU-8 surface to make a ground plane for the device. The carrier wafer is then removed and the PMMA dissolved out of the structure using acetone. The mask set can make an array of 8×8 of the basic device layout.

What has been described is the technology of the building of rods for quadrupole mass filter devices where the length is extended by incremental layers.

What is claimed is:

1. A rod shaped conductor member in a quadrupole mass filter device wherein said rod shaped conductor member is in a conduit mold.

2. The quadrupole mass filter rod shaped conductor member of claim 1 wherein said member is a conduit mold member filled with conductor material.

3. The quadrupole mass filter rod shaped conductor member of claim 2 wherein said member is a conduit mold member filled with Cr/Au.

4. The quadrupole mass filter rod shaped conductor member of claim 2 wherein the length dimension of said member is achieved through vertically repeated conduit mold formations.

5. The quadrupole mass filter rod shaped conductor member of claim 2 wherein the length dimension of said member is achieved through vertically repeated conduit mold formations filled with the material to be used in said rod member.

6. The quadrupole mass filter rod shaped conductor member of claim 5 wherein the length dimension of said member is achieved through vertically repeated conduit mold formations filled with Cr/Au.

7. The quadrupole mass filter rod shaped conductor member of claim 6 wherein the length dimension of said member is achieved through vertically repeated conduit mold formations, filled with Cr/Au and subjected to a coalescense operation.

8. In the fabrication of a quadrupole mass spectrometer device of the type wherein, in a wafer shaped bulk region having first and second essentially parallel surfaces, there is positioned, in a spatial volume cavity in said region, four essentially equally spaced as in a bolt circle, conductive rod members that extend between said first and second surfaces; the in situ process of incremental rod length fabrication comprising in combination the steps of;

providing, on a silicon substrate wafer having first and second faces separated by an about 150 micrometer thickness and further having an about 1 micrometer thick oxide barrier coating over all of said faces of said wafer, applying, on said first face of said substrate wafer, a layer of an etching resist material, in a dark field pattern operable for defining location and area of the footprints for said four rod members, for defining locations of future entry and exit holes through said first and second surfaces, and for alignment guide marks, etching, holes completely through said substrate wafer using deep ion etching, in said pattern for said rod members, and for said entry and exit holes, forming, an about 1 micrometer thick insulating oxide barrier coating on said first face of said substrate wafer, providing, a first carrier wafer member having a pattern of opening holes and a strike type plate layer for the electroplating of said rod members but not said entry and access holes, positioning said first carrier wafer on and attached to said first face of said substrate wafer, filling said through holes in said first carrier wafer with Au metal, removing said first carrier wafer from said substrate wafer, forming a second oxide barrier layer over the entire substrate wafer including the Au filled holes, forming on said second barrier layer, an etching followed by lift off patterning operation, in depositing conductors for said first diagonal pair of said rods, depositing Cu/Au metal connecting lines to said first diagonal pair of said rods, forming a patterned insulation oxide coating for connection openings to the remaining diagonal pair of said rods, depositing Cr/Au metal connecting lines to said remaining diagonal pair of said rods, fliping said substrate wafer over and positioning for conductor mating on the opposite side in further processing, forming a pattern of openings, in a dark field pattern, through the barrier layers of said flipped over substrate wafer for electroplating said rods, depositing an electroplating metal electrode layer, over a first surface of a second carrier wafer, mounting said substrate wafer to said first surface of said second carrier wafer, applying an about 100 micrometer thick coating of BPR type photo resist over said second surface of said substrate wafer, patterning into said BPR resist, access openings for electroplating said rods, said openings are to be about 90 micrometers across, the centers are to be placed at the corners of a square 150 micrometers on a side, electroplating said rods with (Cr/Au) metal until the plating extends the rods into a pedestal of about 100 micrometer rod length extended rods, spin coating, over said substrate wafer with said pedestal of first 100 micrometer extended rods, a second, about 100 micrometer thick layer of BPR type photo responsive resist, forming a second, superimposed registered access opening pattern, in said second BPR type photo resist layer, for continuing the electroplating extension of said rods, electroplating said rods with (Cr/Au) metal to about the thickness of said spin coating, producing thereby a continued rod pedestal assembly with said rods each having an about 200 micrometer rod length extension beyond said substrate wafer, spin coating, over said substrate wafer with and said first and second extended rod increments, a third 100 micrometer thick layer of BPR type photoresponsive resist, forming an access opening pattern in said third BPR resist layer for electroplating a further extension of said rods, electroplating said rods with (Cr/Au) metal, producing thereby a continued rod pedestal configuration with an about 300 micrometer rod length extension beyond said pedestal, continuing said series of incremental spin coating over said substrate wafer with a, spin coated layer of BPR resist, forming said rod access openings and extending said rods by electroplating extensions until said example 500 micrometer desired rod length dimension is achieved, dissolve any BPR type resist on said substrate wafer surface surrounding the desired rod length rod assembly, laser machining a cavity in an enclosing silicon wafer member of about the same said 500 micrometer thickness with an opening through said enclosing wafer member that will enclose all said extended rod pedestals, spin coating an about 20 micrometer thick layer of a SU8 type of photo responsive resist on said cavity enclosing wafer member for service as a bonding layer, forming a bonding attachment of said cavity supporting wafer member to the surface of said substrate wafer, filling the extended rod containing cavity with a PMMA type photoresist, planarizing said cavity supporting wafer surface, spin coating, a 20 micrometer thick layer of SU8 type resist, on said cavity supporting wafer surface, opening, a pattern of ion passage apertures, depositing a thin metal film over the remaining said SU8 resist to serve as a ground plane for the fields to be in said filter device, removing said carrier wafer, and, dissolving said PMMA out of said cavity structure using an agent such as acetone.

* * * * *